Sept. 10, 1963   P. PALAJAC, JR   3,103,349
VEHICLE SUSPENSION
Filed June 28, 1960
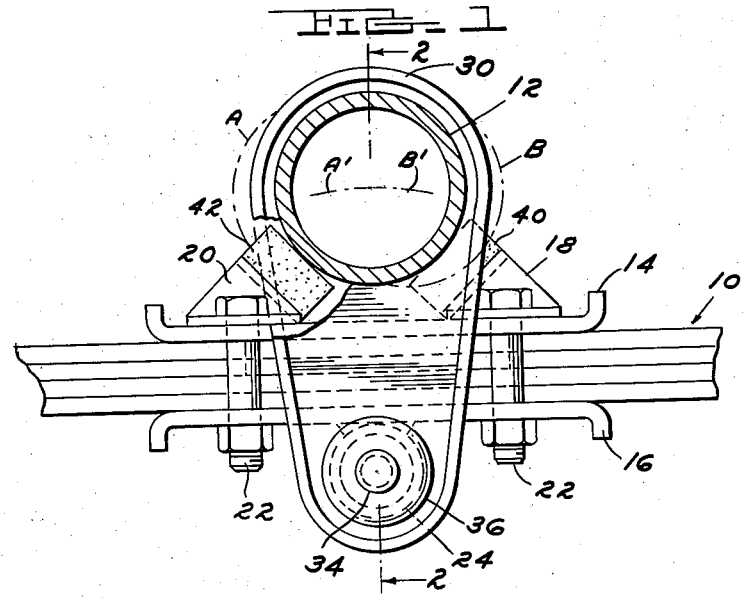
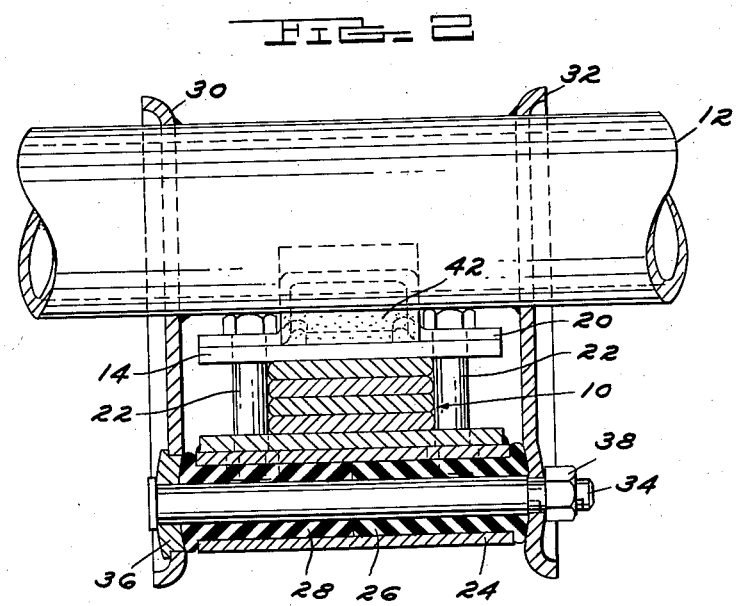
PETER PALAJAC JR.
INVENTOR.
BY John R. Faulkner
   Clifford L. Sadler
ATTORNEYS _United States Patent Office_ 3,103,349
Patented Sept. 10, 1963

3,103,349
VEHICLE SUSPENSION
Peter Palajac, Jr., Dearborn, Mich., assignor to Ford Motor Company, Dearborn, Mich., a corporation of Delaware
Filed June 28, 1960, Ser. No. 39,275
3 Claims. (Cl. 267—52)

The present invention relates to vehicle suspension systems and more particularly to a device for securing an axle housing to leaf type suspension springs.

In motor vehicles having longitudinally extending leaf members acting as suspension springs, it has heretofore been common practice to secure the axle housing rigidly to a central portion of the springs. This arrangement has the disadvantage that shocks occurring when the wheels strike minor obstacles in the road are transmitted directly through the axle to the springs. As the springs are attached more or less rigidly to the vehicle body, these shocks are also transmitted to the passenger compartment within the vehicle body resulting in what is known as ride harshness.

In accordance with the present invention, means are provided to permit limited relative movement between the axle housing and the leaf springs. More specifically, this invention provides a pivoted shackle-like connection between the leaf springs and the axle housing so that when one of the wheels carried by the axle strikes an object in the road, a small amount of longitudinal movement will be permitted between the axle and the spring. Such action absorbs some of the road shock and is sometimes referred to as wheel recession or compliance.

In the preferred embodiment a rear axle assembly is connected to a clamping device for the rear leaf spring of a vehicle by a tension type shackle. The shackle being in tension provides a loading restriction to fore and aft movement of the axle except when the wheels encounter a bump, braking forces or acceleration forces and then fore or aft movement of the shackle absorbs the forces. The result is a reduction in harshness and transmission of axle noise.

Further objects and advantages of this invention will be fully understood from the following description and the accompanying drawings in which:

FIGURE 1 is a side elevational view partly in section of the axle housing to leaf spring connection, and FIGURE 2 is a front elevational view partly in section taken along section lines 2—2 of FIGURE 1.

Referring to the drawings where the preferred embodiment of the present invention is shown, a plurality of longitudinally extending leaves forming spring 10 are disclosed which are to be located adjacent the vehicle's rear wheels. The rear wheels are connected to a driving axle that is journalled within a tube like axle housing 12.

The elongated leaves forming the spring 10 are contained between upper and lower plates 14 and 16. Positioned on the upper plate 14 is a pair of brackets 18 and 20 that are located equal distance from the center of the axle housing 12. A set of four bolts 22 pass through the brackets 18, 20, the upper plate 14, and the lower plate 16 so as to secure the brackets 18, 20 and plates 14, 16 together about the springs 10.

A tubular piece 24 is welded to the lower plate 16 and carries a pair of rubber bushing members 26 and 28 within its bore.

A pair of tension shackles 30, 32 having a generally elongated configuration are pivotally connected to the bushing of the tubular piece 24. The shackles 30, 32 have a large opening at their upper ends to receive the axle tube 12 and are welded thereto in a depending position. The shackles 30, 32 are located on either side of the plates 14, 16 and extend with their lower ends over the outer ends of the bushings 28, 26. The depending ends of the shackles 30, 32 are pivotally connected through the bushings 26, 28 to the tube 24 by means of a bolt 34 which is positioned coaxially within the bushings 26, 28. A washer 36 is located at the head end of the bolt 34 and positions that end of the bolt relative to shackle 30. A nut 38 is located at the threaded end of the bolt 34 and secures the components in a pivotal connection.

The construction is completed by a pair of rubber stops 40 and 42 which are located on the brackets 18 and 20 juxtaposed with the axle housing 12.

The described structure permits the axle tube 12 and the supporting members associated therewith to move in a fore and aft direction relative to the spring 10. This movement occurs as slight rotation about the axis of the bolt 34 and is controlled in part by bushings 26, 28. The movement is further cushioned by means of the rubber stops 40, 42. The fore and aft compliance of the axle tube 12 is indicated by the dotted lines A and B. The center of the wheel carrying axle contained within the tube 12 may move between the two limits A' and B'.

The foregoing description presents the preferred embodiment of the present invention and provides means for slight fore and aft movement of the road wheels relative to their supporting leaf spring so as to cushion road shocks and prevent the transmission thereof to the passenger carrying vehicle body.

Modifications and alterations of this invention may occur to those skilled in the art which will come within the scope and spirit of the following claims.

I claim:

1. An axle housing having depending shackles, a leaf spring transversely situated relative to said axle, pivot means having an axis parallel to said housing joining said shackles and said spring, and rubber members limiting permissible relative movement between said housing and said spring.

2. An axle tube having a pair of depending tension shackles, a leaf spring transversely situated relative to said axle and between said shackles, rubber bushing means joining said shackles and said spring, said bushing having a pivot axis generally perpendicular to said spring, and rubber members limiting permissible relative movement between said tube and said spring.

3. A device for securing an axle tube to a longitudinally extending leaf spring comprising a pair of depending tension shackle members secured to said tube, a bracket member secured to said spring, said bracket member having a transverse rubber bushing located beneath said spring, said shackle members being pivotally connected to said bushing, and a second bracket member secured to the upper side of said spring, said second bracket member being spaced apart from said axle tube.

References Cited in the file of this patent

UNITED STATES PATENTS

| | | |
|---|---|---|
| 1,240,929 | Bissell | Sept. 25, 1917 |
| 2,274,518 | Baker | Feb. 24, 1942 |
| 2,309,812 | Utz | Feb. 2, 1943 |
| 2,621,920 | Hogsten et al. | Dec. 16, 1952 |
| 2,942,870 | Balding | June 28, 1960 |